US011416868B1

(12) United States Patent
Russell

(10) Patent No.: US 11,416,868 B1
(45) Date of Patent: Aug. 16, 2022

(54) METHODS AND SYSTEMS FOR THIRD-PARTY APPROVAL OF SECURE ACCOUNT FUND TRANSFER

(71) Applicant: UIPCO, LLC, San Antonio, TX (US)

(72) Inventor: Ryan Thomas Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/728,791

(22) Filed: Dec. 27, 2019

(51) Int. Cl.
*G06Q 20/42* (2012.01)
*G06Q 20/34* (2012.01)
*G06Q 20/10* (2012.01)
*G06Q 20/02* (2012.01)

(52) U.S. Cl.
CPC ........... *G06Q 20/42* (2013.01); *G06Q 20/027* (2013.01); *G06Q 20/10* (2013.01); *G06Q 20/341* (2013.01)

(58) Field of Classification Search
CPC .... G06Q 20/42; G06Q 20/027; G06Q 20/341; G06Q 20/10
See application file for complete search history.

(56) References Cited

U.S. PATENT DOCUMENTS 5,206,495 A * 4/1993 Kreft .................... G06K 7/0008 235/380
5,953,710 A * 9/1999 Fleming ................. G06Q 20/04 705/38
6,671,818 B1 12/2003 Mikurak
8,971,908 B1 * 3/2015 Kirkpatrick ........... H04W 76/38 455/452.1
10,445,739 B1 * 10/2019 Sahni ................... G06Q 20/382
10,554,654 B1 * 2/2020 Ramanathan .......... G06Q 20/40
2003/0162565 A1 * 8/2003 Al-Khaja ............. H04M 15/00 455/558
2004/0015702 A1 1/2004 Mercredi et al.
2006/0156392 A1 7/2006 Baugher
2009/0172793 A1 * 7/2009 Newstadt ............... G06Q 40/02 726/6

(Continued)

FOREIGN PATENT DOCUMENTS

WO WO-2015083159 A1 * 6/2015 ............. G06Q 20/02
WO WO-2016110588 A1 * 7/2016 ............ G06F 21/53

OTHER PUBLICATIONS

Guardian-Based Financial Endorsement Enablement for Commerce; An IP.com Prior Art Database Technical Disclosure ; Authors et al.: Disclosed Anonymously (Year : 2019).

(Continued)

*Primary Examiner* — David P Sharvin
(74) *Attorney, Agent, or Firm* — Plumsea Law Group, LLC

(57) ABSTRACT

A method and system of delegating control to a surrogate for a primary account holder so that the surrogate can control access to funds in a joint account by a secondary account holder when the primary account holder is unavailable. The surrogate's ability to approve or deny the secondary account holder's requests for funds is limited by rules established by the primary account holder. The system includes a secure management account system that implements communications between the surrogate's personal device, the primary account holder's personal device, the secondary account holder's personal device and the financial institution holding the joint account.

11 Claims, 10 Drawing Sheets

(56) References Cited

U.S. PATENT DOCUMENTS

2009/0254461 A1* 10/2009 Walker .................. G06Q 20/16 705/30
2009/0319353 A1 12/2009 Palmeri
2011/0191209 A1* 8/2011 Gould ................ G06Q 30/0637 705/26.82
2012/0197793 A1* 8/2012 Grigg .................... G06Q 20/42 705/41
2013/0018792 A1 1/2013 Casey et al.
2013/0346302 A1* 12/2013 Purves ................ G06Q 20/108 705/40
2014/0201077 A1* 7/2014 Cama .................. G06Q 20/405 705/44
2014/0279513 A1* 9/2014 Dodds-Brown ... G06Q 30/0207 705/44
2015/0033286 A1* 1/2015 Shahidzadeh ........... H04L 63/20 726/1
2015/0058214 A1* 2/2015 Cohen ................... G06Q 20/34 705/41
2015/0120546 A1* 4/2015 Fernandes ............ G06Q 20/229 705/44
2015/0302404 A1* 10/2015 Rutter ................... G06Q 20/24 705/44
2015/0348032 A1* 12/2015 Ioveva .................. G06Q 20/12 705/44
2015/0348185 A1* 12/2015 Frost ...................... G06Q 40/02 705/35
2016/0162812 A1 6/2016 Rowley et al.
2017/0061406 A1* 3/2017 Adams .................. G06Q 20/32
2017/0068938 A1 3/2017 Narayana et al.
2017/0076274 A1* 3/2017 Royyuru ................ G06Q 20/20
2017/0337546 A1* 11/2017 Holmes .................. G06Q 40/00
2018/0047026 A1* 2/2018 Vaidyanathan .... G06Q 20/3829
2018/0108011 A1* 4/2018 O'Regan ................ G06Q 20/36
2018/0225666 A1* 8/2018 Khan ................... G06Q 20/405
2019/0108524 A1 4/2019 Nicholson et al.
2019/0287106 A1 9/2019 Sadeddin et al.
2019/0334884 A1* 10/2019 Ross ................... H04L 63/0442
2019/0370787 A1* 12/2019 Mueller ............. G06Q 20/3674
2019/0385152 A1* 12/2019 Eu ...................... G06Q 20/3274
2020/0090148 A1* 3/2020 Lawrence .............. G06Q 50/01
2020/0211026 A1* 7/2020 Ross .................... G06Q 20/027

OTHER PUBLICATIONS

Non-Final Office Action dated Aug. 17, 2021 for U.S. Appl. No. 16/730,431.
Notice of Allowance dated Dec. 13, 2021 in U.S. Appl. No. 16/730,431.
Non-Final Office Action dated Feb. 15, 2022 for U.S. Appl. No. 16/728,062.

* cited by examiner

METHODS AND SYSTEMS FOR THIRD-PARTY APPROVAL OF SECURE ACCOUNT FUND TRANSFER

TECHNICAL FIELD

The present disclosure generally relates to methods and systems for requesting and receiving approval in real time from a third party for the use of funds in a joint or shared account.

BACKGROUND

In many cases, joint bank or credit card accounts, or other financial accounts, may have a primary account holder and a secondary account holder. In some of those cases, the primary account holder may need to limit the expenditures of funds by the secondary account holder, while nevertheless retaining the ability to approve certain expenditures even though they may exceed preset fixed limits. For example, a parent of a college student may list the student as a secondary account holder on a joint account, but would need to retain some degree of control over the college student's expenditures, without unduly limiting the student's ability to make routine expenditures. In those cases, the primary account holder would need to have a system in place that would allow his or her prompt approval of requests for expenditures above a certain limit submitted by the secondary account holder. However, in those cases, if the primary account holder is unavailable, the secondary account holder would not be able to receive approval for the transaction.

For these reasons, there is a need for a system and method that ensures that secondary account holders such as young adults, dependents or other persons may receive approval for expenditures from a joint account even when the primary account holder is not available to grant approval of the proposed expenditure.

SUMMARY

In one aspect, embodiments include a method for providing responses in real time to fund transfer requests submitted by a secondary account holder of a joint account at a financial institution, wherein the joint account is controlled by a primary account holder. The method includes delegating responsibilities for responding to fund transfer requests to a surrogate when the primary account holder is unavailable, and then determining that the primary account holder is unavailable. The method further includes transmitting fund transfer requests from a second device associated with the secondary account holder to a third device associated with the surrogate, then displaying the fund transfer request on the third device. The method also includes providing an approve box and a deny box on a display of the third device so that the surrogate may respond to the fund transfer request. The method also includes the surrogate then responding to the funds transfer request by pressing one of the approve box and the deny box on the display of the third device, transmitting the surrogate's response to the fund transfer request from the third device to the second device, and also transmitting instructions to disburse funds to the financial institution from the joint account whenever the surrogate activates the approve box.

In another aspect, embodiments include a system for controlling the disbursement of funds from a joint account held in a financial institution, the joint account having a primary account holder and a secondary account holder. The system includes a second device associated with the secondary account holder configured to submit fund transfer requests to a third device associated with a first surrogate through an account management service. The third device is configured to allow the first surrogate to respond to the fund transfer request. The account management service is configured to receive the fund transfer requests from the second device, to submit the fund transfer requests to the third device, and to transmit approvals of fund transfer requests to the financial institution whenever the surrogate approves the fund transfer request.

In another aspect, embodiments include a system for allowing a surrogate to exercise control over expenditures by a secondary account holder of a joint account at a financial institution controlled by a primary account holder. The system includes a requester interface for receiving fund transfer requests from a device associated with the secondary account holder, a primary approver interface configured to determine that the primary account holder is not available to respond to fund transfer requests in real time, and a surrogate interface configured to transmit funding requests to at least one device associated with at least one surrogate when the primary approver interface has determined that the primary account holder is not available in real time. It also includes an approval module configured to transmit approvals of fund transfer requests to the financial institution through a secure gateway.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
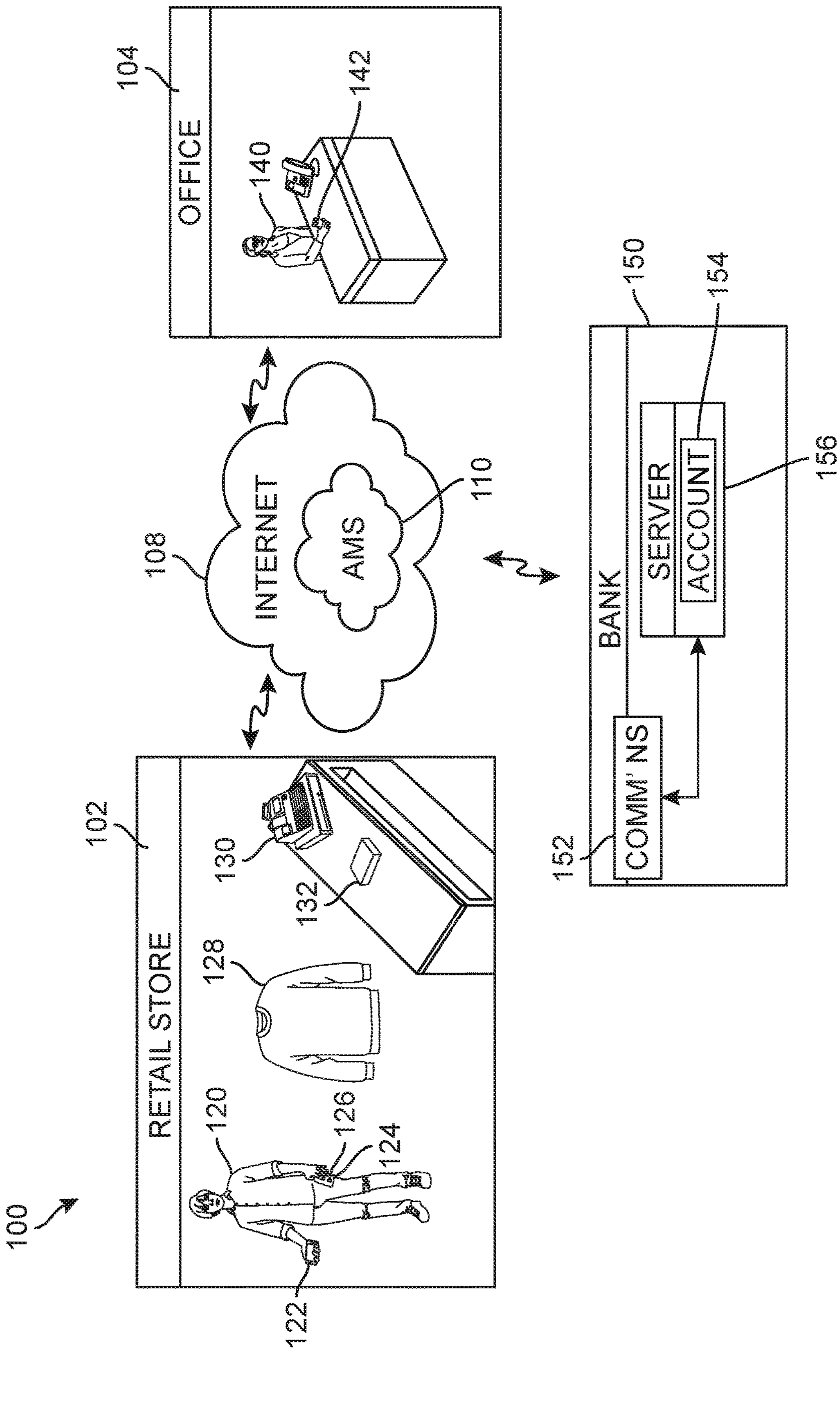
FIG. 1 is a schematic diagram illustrating an embodiment of a system that provides a primary account holder control over expenditures by a secondary account holder.

The embodiments disclosed herein provide a system and method for real-time authorization by a third party acting as a surrogate for the primary account holder of a joint bank account for the disbursement of funds from the joint account when the primary account holder is unavailable. The proposed system and method take advantage of the growing presence and availability of devices such as smart phones, tablets, laptop computers, personal devices and other similar devices in the day-to-day life of persons in all walks of life. These devices allow the transmission of requests, approvals, denials or requests for information virtually in real time, such as in seconds or minutes. As will be discussed below, the proposed systems and methods can enable a primary holder of a joint bank account to use his or her device to regulate in real time the withdrawal of funds from the joint bank account to ensure that proposed withdrawals by a secondary account holder can be reviewed either by the primary account holder or by his or her designated surrogate before the withdrawals can be made. In this way, the primary account holder can control disbursements from the joint account without unduly limiting the secondary account holder's use of the funds for routine or unobjectionable expenditures.

If the primary account holder cannot respond in real time to a request by the secondary account holder for a specific expenditure, the authority to approve or deny a request for the expenditure may be delegated to a surrogate. In that case, the notifications of requests for funds by the secondary account holder may be sent to a third-party surrogate to whom the primary account holder has delegated his or her authority. For example, when a secondary account holder is submitting a request for approval of a purchase or of a withdrawal of funds from the joint account when the primary account holder cannot respond to the request, the surrogate can respond to the request and approve or deny the request following parameters set by the primary account holder.

"Real time," as used herein, shall mean a reasonable amount of time under the circumstances. For example, when the secondary account holder is attempting to buy gas at a gas station or withdraw cash from an ATM, "real time" may only be about one or two minutes, whereas "real time" in a retail store may be much longer, for example up to five or even up to ten minutes.

The term "financial institution" shall refer to any institution that holds funds for others, including without limitation banks, savings and loans, credit unions, colleges or universities, and accounts that may be accessed through ATMs. In addition, the term "financial institution" shall also refer to credit card issuers. Also, the terms "merchant" and "retailer" shall include any person, entity, distributor system, software, and/or hardware that is a provider or broker of goods/services, and includes any other entity in the distribution chain of goods/services. For example, some common merchant/retailers may include a grocery store, a retail store, a travel agency, a service provider, a public-service utility, a school, a library, an on-line merchant, a government agency, and so on. A non-typical merchant may be a host of a garage sale or a host of a fund-raising activity, or other independent sellers. Generally, a consumer may communicate or interact with a merchant in person (e.g., in person at a store), telephonically, or electronically (e.g., from a computer via the Internet).

In addition, references to a "primary account holder" will refer to a person or entity that is fully authorized to control, manage and access all aspects of a secured resource such as a checking or savings account at a bank or credit union or other financial institution, or a credit card account. In many cases, that person may be a parent or a guardian of a secondary account holder who may be, for example, a student. For example, both the parent/guardian and the student may be listed on a checking or savings account or on the credit card account, but the parent/guardian needs to retain some level of control over withdrawals from the account by the student. In other cases, the primary account holder may be a person responsible for an account owned by a non-profit organization, while the secondary account holders may be volunteers working for that organization who may need to make expenditures during their volunteering activities, but who should not have unfettered discretion in making such expenditures.

In some cases, the primary account holder may be, for example, an insurance company from whom the secondary account holder has purchased an insurance policy to cover his or her car, rental unit or home, for example. The policy holder (who would be the secondary account holder in this example) may have been provided with a chip card so that he or she may make purchases and charge those purchases to the insurance company. For example, the insurance company may have a list of approved providers that the policy holder is invited to work with or shop from. In those cases, the insurance company would like to retain control over the amounts charged to the chip card. Moreover, to the extent that employees within the insurance company may be unavailable, the insurance company may decide to appoint certain persons who are not employees of the insurance company, such as agents, adjusters or contactors, to act as surrogates in determining whether a particular transaction should be approved. Thus the embodiments described herein may apply to cases in which an insurance company is the primary account holder.

In other cases, the financial institution may be an insurance company holding funds owed to an insured party (for example, a home owner whose home has been damaged) or to an injured party whom the insured has injured, and to whom the insured is liable for the damages the insured caused to the injured party (such as person who was injured in a traffic accident caused by the insured). In these cases, the primary account holder may be the insured party or may be the injured party. In those cases, the secondary account holder may be a party providing services to the insured homeowner (a plumber, for example) or to the injured party (a surgeon, for example). In either of these possible scenarios, should the secondary account holder (the plumber or the surgeon) submit an invoice for payment, the primary account holder (either the insured party or the injured party in these scenarios) may delegate approval or denial decisions to a surrogate whenever the primary account holder may be unavailable.

The term "surrogate" shall refer to any person to whom the primary account holder of a joint account has delegated the responsibility for approving or denying requests submitted by the secondary account holder.

While several specific examples of account management methods and systems for joint accounts will be described below, it is to be understood that the various aspects and features of each embodiment may be applied to any of the particular applications discussed herein. Thus, in some embodiments, the system may be a standalone account management system or it may be a component of an integrated software solution for joint account management. The AMS may be housed in a bank or other financial institution, or in a separate server, rather than being based in the cloud as in the other embodiments disclosed herein. In other embodiments, the system may be integrated into existing business and financial processes and products.

FIG. 1 is a schematic diagram of an example of a system for securely transmitting an account transaction approval request when the primary account holder is available to provide her or his approval or denial of a request by the secondary account holder. FIGS. 2 through 10 illustrate embodiments of systems and methods that provide for a third party to grant or deny approval when the primary account holder is unavailable, as discussed below.

The figures illustrate different examples of user interfaces that may be presented on a touchscreen display of a mobile device, offering content via native controls included in the interface and shown on the display. Throughout this application, the term "interface" may be understood to refer to a mechanism for communicating content through an application on a device to a user of the application. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls.

In some embodiments (not shown in the drawings), the interface can include a welcome or header message(s), and/or a plurality of data input fields. Some non-limiting examples of such fields can include options directed to identification of the account owner and other users (e.g., name, phone number, address). In addition, the interface can provide a plurality of selectable options, such as navigation options (e.g., "Back", "Save", "Next"), or additional menu options for accessing other features or aspects of the profile. As a general matter, it should be understood that the text and specific wording shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the user's system, including spaced apart from, adjacent to, or around the user interface. In other words, the figures present only one possible layout of the interface, and do not in any way limit the presentation arrangement of any of the disclosed features.

The archetype used for illustration purposes in the embodiments disclosed in this application is a college student sharing a joint bank account with his mother. For the sake of simplicity, the mother may be a single parent who has the sole responsibility for the college student. The mother would be the primary account holder, and the college student would be the secondary account holder. An example is illustrated in the schematic diagram 100 of FIG. 1 which shows a secondary account holder 120 standing in a retail store 102. In this example, he is a college student contemplating the purchase of a sweater 128. He is holding a computing device, in this example a smart phone 122, in his right hand, and a chip debit card 124 (i.e., a debit card with a chip) in his left hand. The chip debit card is linked to the joint account, such that any expenditures made using the chip debit card 124 are automatically withdrawn from the joint account once the transaction is approved by the primary account holder and the student enters his PIN into the chip reader. However, embodiments disclosed herein should be understood to include any transactions in which a computing device, whether it is a smart phone, a smart tablet, a laptop computer or other device is used to request fund transfers or to respond to such requests.

In this example, the chip debit card 124 has a chip 126 which can activate an authorization process when chip debit card 126 is inserted into a chip reader such as chip reader 132 which is associated with cash register 130 in retail store 102. In this embodiment, student 120 uses his smart phone 122 to transmit a request over the Internet 108 for approval to his mother 140 who is working in an office 104 at some remote location. The request/approval/denial process is managed by a secure Account Management Service (AMS) 110 which is based in the cloud. When the mother 140 receives the request on her smart phone 142 (or other device, such as a laptop computer or a tablet), she can approve the transaction or deny the request. Her decision may then be transmitted back to the student via AMS 110.

If she approves the transaction, that approval is transmitted via AMS 110 to bank 150 through the bank's communications module 152, so that the funds can be withdrawn from the joint account 154 maintained in server 156 to pay the merchant who owns the retail store. If the primary account holder approves the request, the student may enter a PIN to confirm his identity as an authorized user of the chip card. If she denies the request, the student's chip card will not be enabled if it is inserted into chip card reader 132, even if the student were to enter his personal identification number (PIN). Note that if the chip card were a credit card, the same sequences would take place, except that the funds expended by the purchase of the sweater would be added to the amount owed on the credit card account, and the approval would be transmitted to the credit card issuer by the AMS. Whether the card is a chip credit card or a chip debit card, it should not have a magnetic strip that allows transactions without requiring entry of a PIN.

In some cases, the primary account holder may be unavailable. For example, she may be a teaching a class in a high school, she may be an attorney in court, she may be a surgeon working on a patient, or she may be in a remote location where cellular phone service is not available. She may also have, for example, left her smart phone at home or in her car, or her smart phone battery may have been drained, or maybe her smart phone is being repaired. In those cases, she may have decided to appoint one or more surrogates who can take responsibility for approval or denial funds transfer requests from the secondary account holder.

Figure 2:
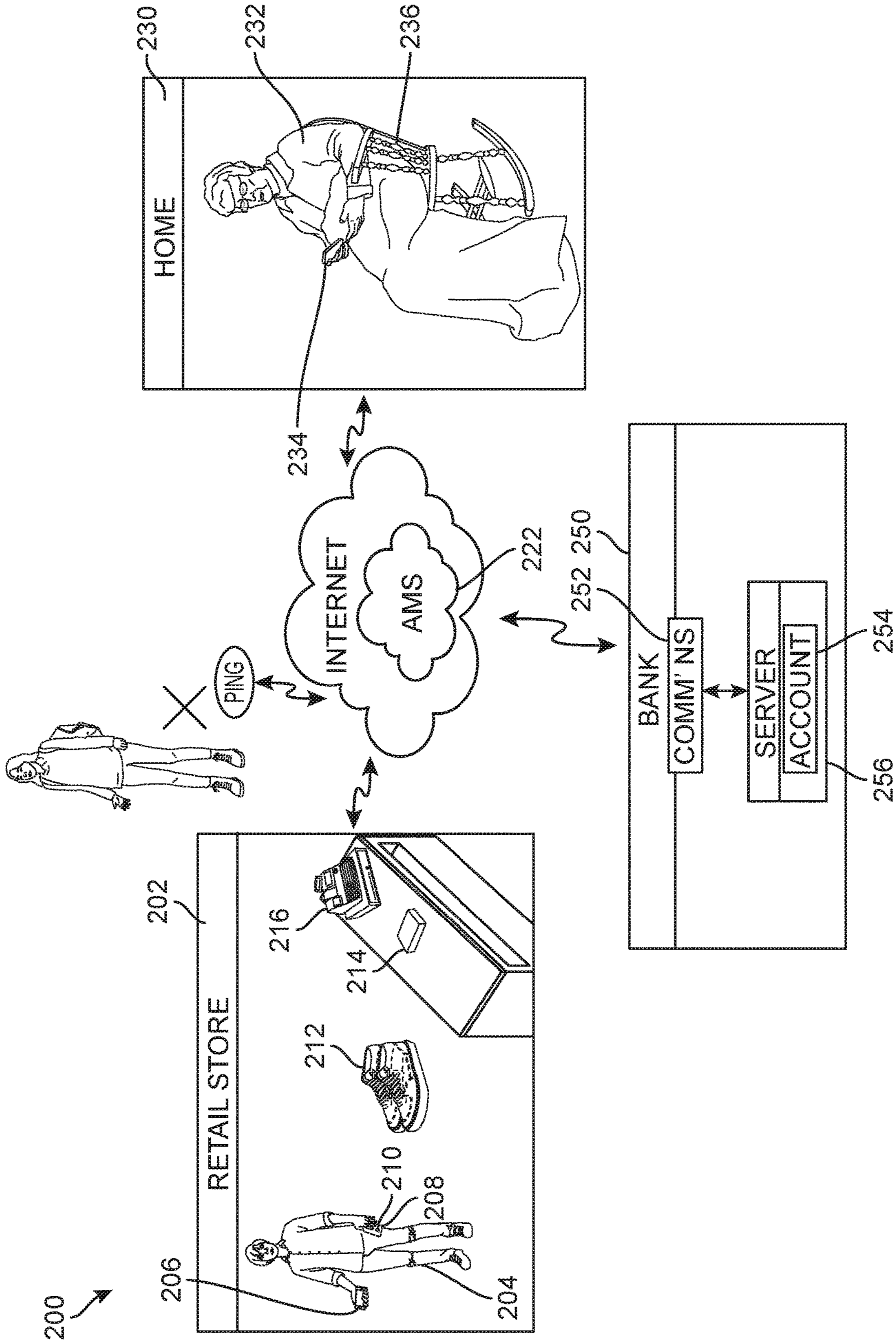
FIG. 2 is a schematic diagram illustrating an embodiment of a system that provides a surrogate control over expenditures by a secondary account holder.

An example of a scenario 200 in which a surrogate assumes responsibility because the primary account holder is unavailable is illustrated in FIG. 2. In this example, the primary account holder has designated the college student's grandmother 232 as a surrogate who may approve or deny requests from the student 204. Thus surrogate/grandmother 232 is sitting in a chair 236 at her home 230 in a remote location holding a smart phone 234. In this example, student/secondary account holder 204 is contemplating buying a pair of shoes 212. He is holding a smart phone 206 in his right hand, and a chip debit card 208 with a chip 210 in his left hand. Student 204 transmits his request to buy the shoes to cloud-based AMS 222. (A ping is a short query sent to another computing device such as a smart phone, a tablet, a laptop or another computing device to determine whether that device is available.) AMS 222 sends a ping to the primary account holder's smart phone, but the ping does not reach that smart phone, as shown by the X interrupting the transmission of the ping from AMS 222. AMS 222 then sends the request to the surrogate's device, in this example smart phone 234. Surrogate/grandmother 232 can then transmit her approval or denial of the request through AMS 222 to student 204. The approval or denial is simultaneously transmitted to bank 250 via communications module 252. If the surrogate has approved the transaction, the funds may be withdrawn from joint account 254 as controlled by the bank's server 256, when the secondary account holder enters his PIN in chip card reader 214, which is associated with cash register 216 in retail store 202. This entire operation may take place in real time, such that the student's purchase of shoes 212 does not take appreciably more time than do other similar retail purchases at the store 202. As in the scenario illustrated in FIG. 1, a similar sequence of events would take place if the student were using a chip credit card instead of a chip debit card, the only differences being that the primary account holder's smart phone would communicate her approval or denial of the transaction through the AMS to the credit card issuer, and the amount spent would be added to the amount owed balance on the credit card.

Instead of a chip debit card, as shown in FIG. 1 and FIG. 2, or a chip credit card, the secondary account holder may be trying to consummate a transaction using other means, such as a mobile phone with a payment app, for example, or by using some other means of making a payment. Also, the transaction may be a simple withdrawal of cash from an ATM or at a bank or savings and loan or other financial institution. In each case, the AMS would direct the secondary account holder's request to the surrogate, and would direct the surrogate's approval (if the request is approved) to both the secondary account holder and to the bank, savings and loan, credit union, credit card issuer or other financial institution.

Although FIG. 1 and FIG. 2 show the AMS as being based in the cloud, the AMS may be based in other locations, such as at a server in the bank or financial institution, a server in a dedicated facility for housing an AMS application or at some other server or device connected via wired, cable, or wireless connections, or a combination of the foregoing to the primary account holder's device, the secondary account holder's device, to the one or more surrogates' devices and to the financial institution hosting the account from which funds are to be withdrawn, for example.

Figure 3:
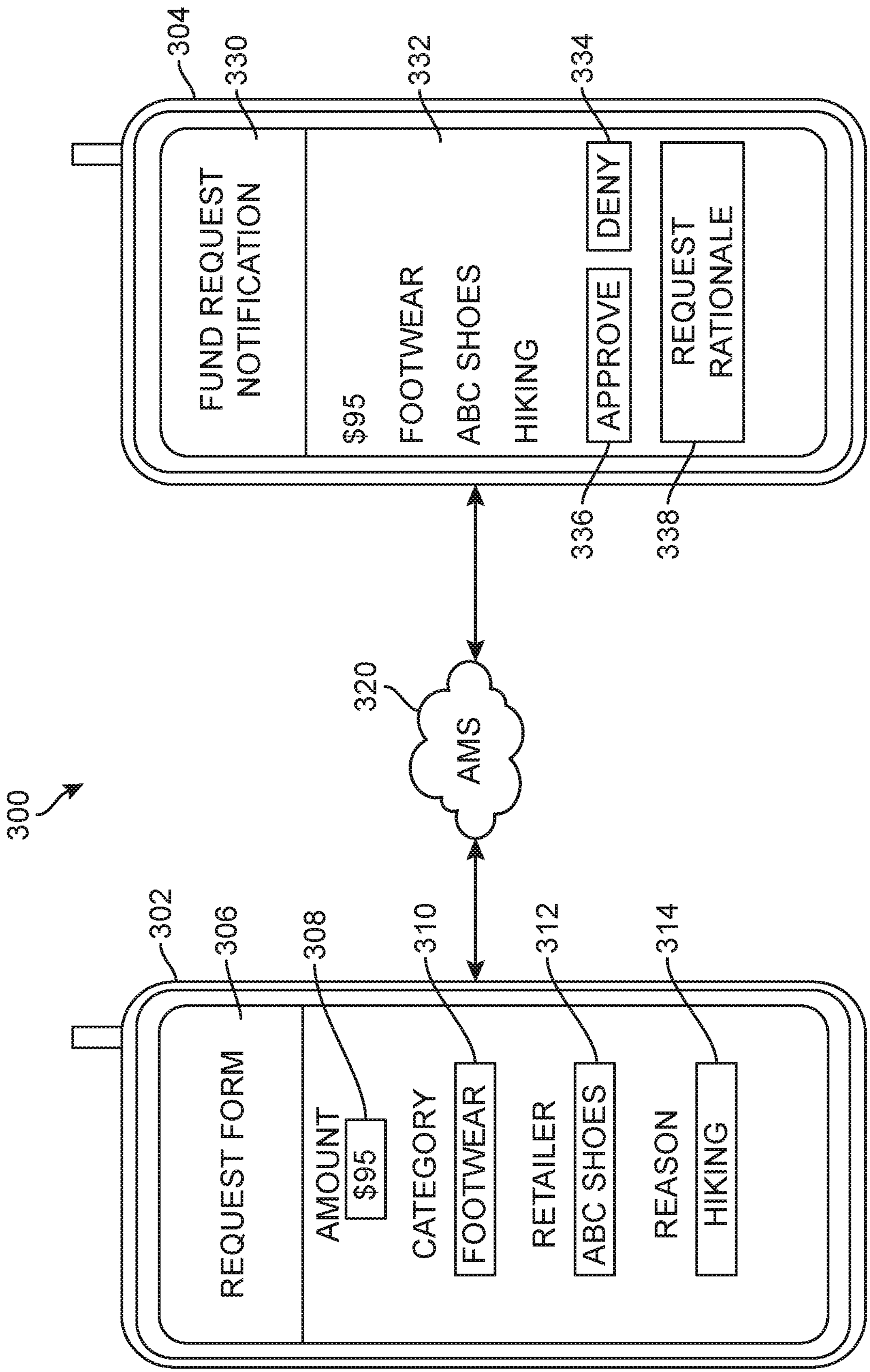
FIG. 3 is a schematic diagram illustrating a submission of a request for approval of a proposed transaction, in an embodiment

The secondary account holder and the surrogate would typically view requests, information and transmit responses via the displays on their smart phones or other devices. FIG. 3 is an illustration 300 of an example of the displays on the secondary account holder's smart phone 302 and the surrogate's smart phone 304, as they receive and transmit messages to each other via a cloud-based AMS. In this example, the secondary account holder has filled out a request form 306, which is shown on both the display of his smart phone as he is filling it out, and on the display of the surrogate's smart phone as she is viewing the request. For example, request form 306 may include provisions for entering an amount 308 of the purchase, the category 310 of the contemplated purchase, the identification of the retailer 312 and the reason for the purchase 314. In this example, the secondary account holder wishes to purchase footwear from retailer ABC shoes so that he can go hiking. This information is transmitted via AMS 320 to the surrogate's smart phone 304. Thus the display 332 on her smart phone shows a funds request notification, listing the amount requested ($95), the category (footwear), the retailer (ABC shoes) and the reason for the purchase (hiking). The surrogate may then approve the proposed transaction by activating the app approving the transaction, for example by pressing her finger on the "approve" box 336 on the display 332 of her smart phone 304, or may deny the request by activating the app for denying the transaction, for example by pressing her finger on the "deny" box 334 on display 332.

The term "box," as used herein, refers to an outline on a touch-screen display, that defines a specific position or specific region on the display that a user may press with his or her finger in order to activate a function. Thus, in the example above, the surrogate can press down on an "approve" or "deny" box outlined on her smart phone display to activate the app that sends her response to the secondary account holder. Also, in addition to the exemplary categories identified in this text and/or shown in the drawings, many other categories may be used in embodiments, including, for example, "miscellaneous" or "other" categories.

In some cases, the surrogate may request the rationale for the purchase, by placing her finger on the "request rationale" box 338 on the display. In some cases, the "request rationale" is generic, without specifying the particular issue that the surrogate wants addressed (best price, why this retailer, why hiking). In other cases, not illustrated in FIG. 3, the surrogate may enter her specific concerns, such as whether the shoes may be available at a lower price from another retailer, or ask the secondary account holder the brand name of the shoes, for example.

In another example, an agent for an insurance company might respond to a funds transfer request by suggesting, for example, a less expensive retailer or contractor, or an equivalent but less expensive brand for a particular product the secondary account holder may be considering buying to replace a damaged item.

Figure 4:
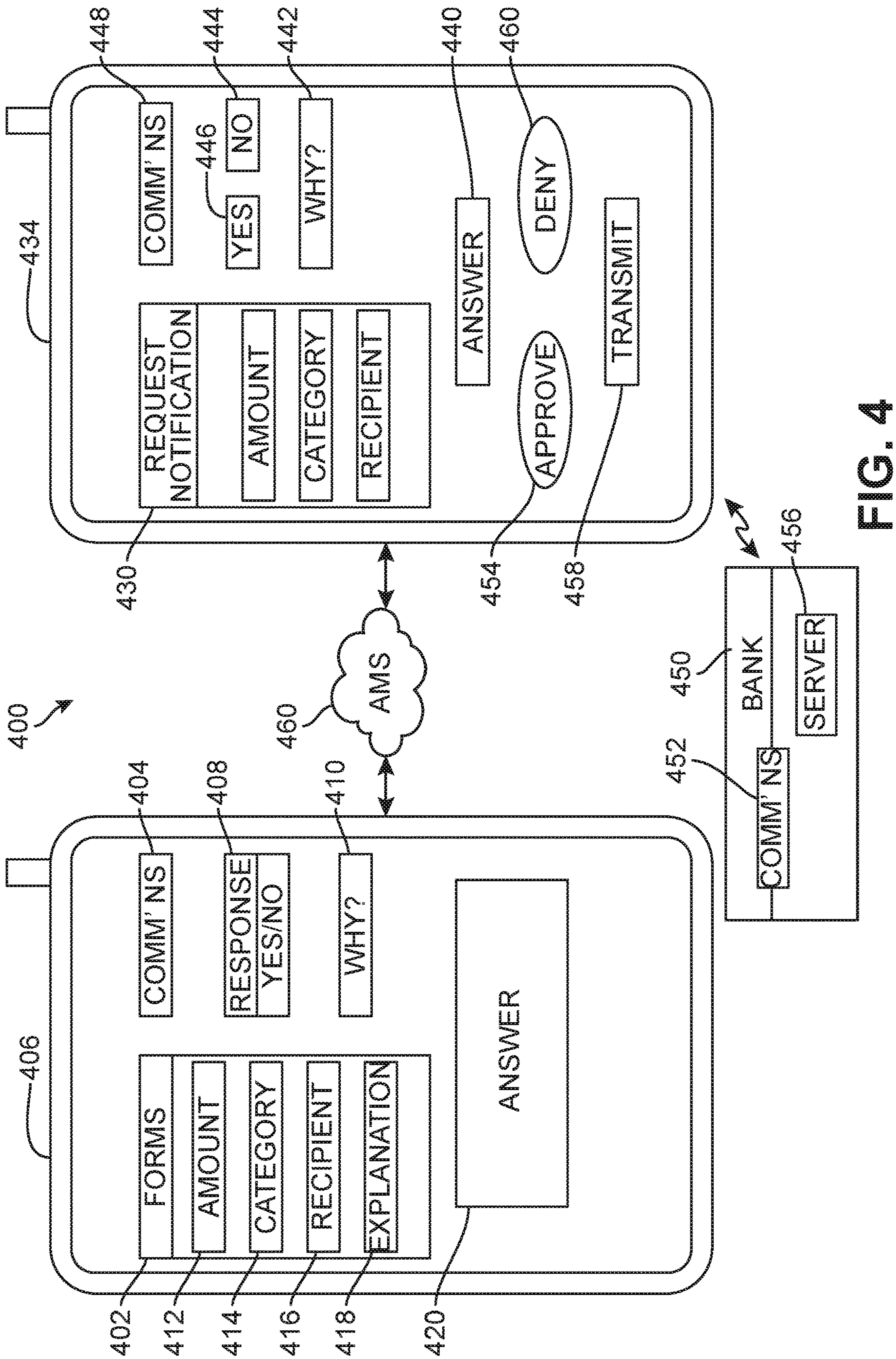
FIG. 4 is a schematic diagram showing the apps and modules in personal devices that may be used to implement the third-party approval system, in an embodiment.

The steps illustrated in FIG. 2 and FIG. 3 may be carried out by the secondary account holder and the surrogate by activating apps on the smart phones or other devices. A schematic diagram of a system 400 for allowing a surrogate to approve or deny a proposed funding request received from the secondary account holder is shown in FIG. 4. This figure illustrates an embodiment in which modules and apps housed in the secondary account holder's device (in this example, a smart phone) and in the surrogate's device (in this example, also a smart phone) may be used to carry out the scenarios illustrated in FIG. 2 and FIG. 3. Thus secondary account holder's device 406 has an app 402 for presenting forms to be filled out on device 406's display; an app 412 for allowing the secondary account holder to enter an amount for the transaction, an app 414 for allowing the secondary account holder to enter the category of the transaction, an app 416 for entering the recipient of the funds that may be withdrawn from the joint account, and an app 418 for entering an explanation or rationale for the transaction. Device 406 also includes a communications module 404 for enabling communications via a cloud-based AMS 460, an app 408 for receiving a "YES" or "NO" response from the surrogate's device 434, and an app 410 for receiving the surrogate's demand for a further explanation for the request. Secondary account holder may respond to a request for further explanation by entering this explanation using answer app 420.

The surrogate's device 434 may have an app 430 for receiving a request notification form from the secondary account holder, which would list, for example, the amount requested, the category of the proposed transaction, and the recipient (e.g., the retailer) of the funds being requested from the joint account. Device 434 may also include a communications module 448, an app 446 for indicating approval of the request, an app 444 for indicating denial of the request and an app 442 for allowing the surrogate to enter a request for an explanation for the proposed transaction. Device 434 also includes an app 440 for receiving the secondary account holder's answer to the request for further explanation, as well as an app 454 to allow the surrogate to approve the transaction after receiving the further explanation and an app 460 to allow the surrogate to deny the transaction after receiving the further explanation. Approval app 454 might allow the surrogate to include a comment to the secondary account holder, such as "I am allowing this today, but will not next time." Deny app 460 might allow the surrogate to include a comment from the surrogate such as "This did not appear to be a necessary transaction." The surrogate's device 434 may also include a transmittance app 458 to direct the surrogate's response through communications module 448 and on to the secondary account holder and/or to bank 450.

In the case of an insurance company being the primary account holder, the surrogate may deny funds transfer for an item not covered by the insurance policy, or may approve funds only up to a certain amount.

In this system, the approval or denial of the funds request may be transmitted in real time from the surrogate's device to bank 450's server 456 via the bank's communications module 452. Thus, should the secondary account holder attempt to consummate the transaction after the surrogate has denied his request, server 456 will deny the funds, for example by refusing to accept the secondary account holder's PIN when he enters the PIN in the chip reader. On the other hand, should the surrogate approve the transaction, the approval would be transmitted to the bank's server, and the chip reader would accept the secondary account holder's PIN, thus allowing the transaction to go through.

Figure 5:
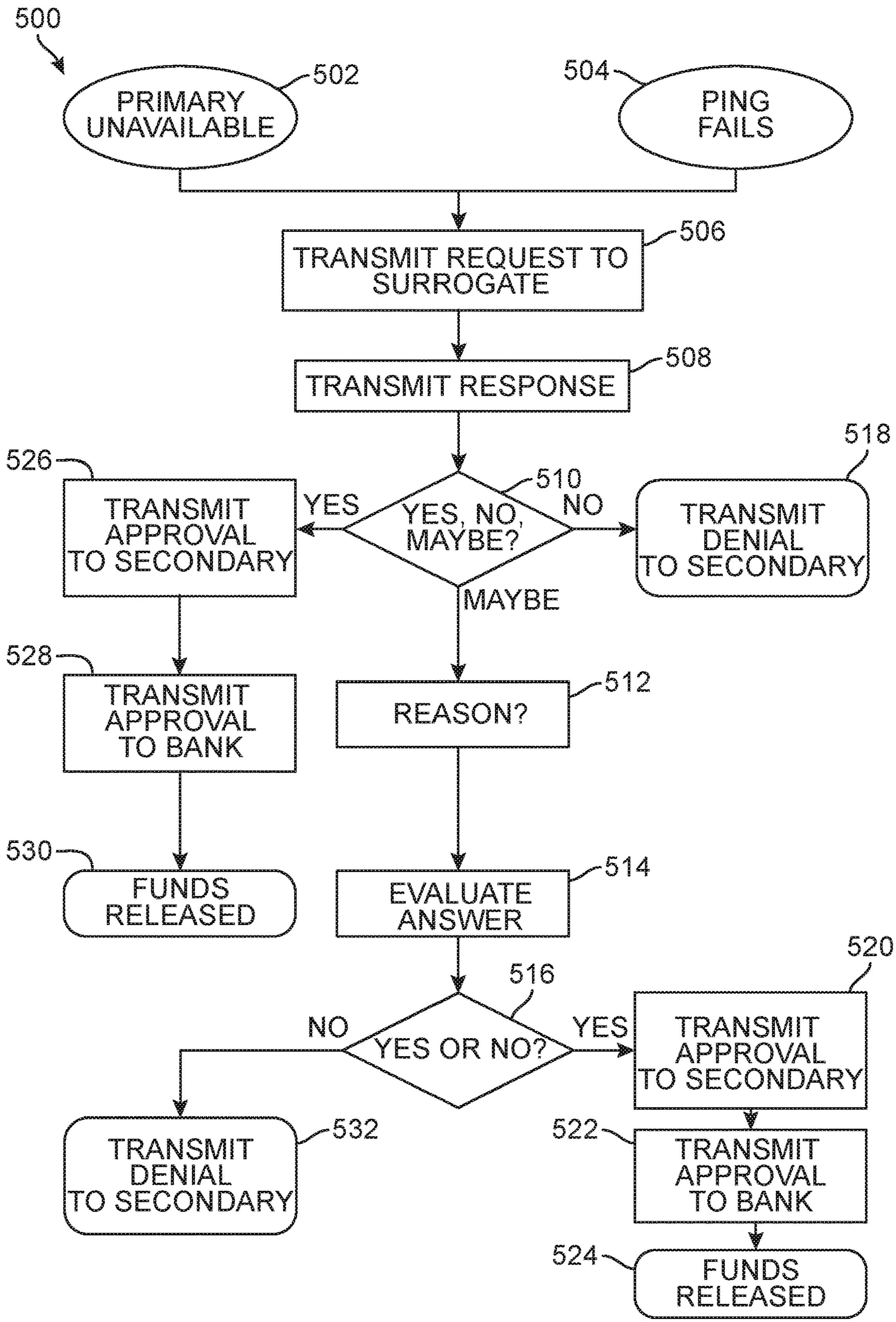
FIG. 5 is an exemplary flow chart showing a third party responding to a request submitted by a secondary account holder, in an embodiment.

There are many possible processes that may be followed to allow a surrogate to carry out her responsibility to approve or deny the secondary account holder's request for funds. Flow chart 500 in FIG. 5 illustrates one exemplary process for allowing a surrogate to approve or deny funds transfer requests from a secondary account holder. The process may start either with a notice to the AMS that the primary account holder will be unavailable in step 502, or with the failure of one or several pings to the primary account holder's device in step 504. Once the AMS has determined that the surrogate is unavailable, it may transmit a request from the secondary account holder's device to the surrogate's device in step 506. The surrogate's device would then receive the request and transmit a response back to the secondary account holder's device in step 508. In step 510, the AMS determines whether the response is a YES, a NO or a MAYBE. If the response is a YES, the approval is transmitted to the secondary account holder in step 526 and to the bank in step 528. The bank may then release the funds in step 530. If the response is a NO, the AMS transmits that denial to the secondary account holder in step 518. If the response is a MAYBE, the surrogate may transmit a request for a rationale through the AMS, asking the secondary account holder for a reason for the request in step 512. When the surrogate receives an answer to her request, she would then evaluate the answer in step 514. If she decides to deny the request, her denial would then be transmitted from her device to the secondary account holder's device in step 532. If the surrogate decides to approve the request, her device would transmit the approval to the secondary account holder's device in step 520, and to the bank's server in step 522. The funds would then be released in step 524.

Figure 6:
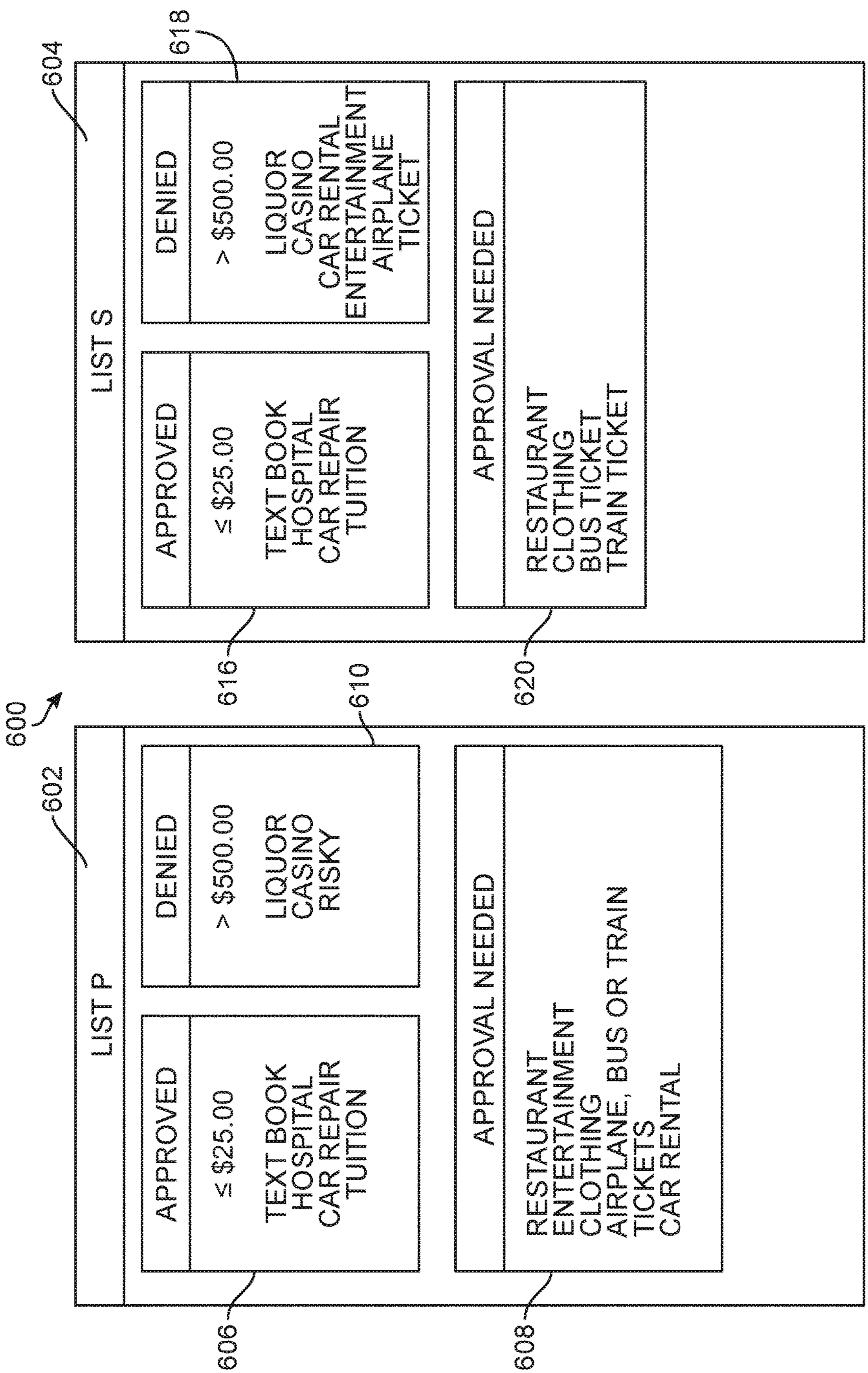
FIG. 6 is a schematic diagram comparing exemplary lists of approved, denied and discretionary expenditures, in an embodiment.

In many cases, the authority granted to the surrogate may be more limited compared to the primary account holder's authority. FIG. 6 is a schematic diagram 600 illustrating the different automatic or discretionary responses that might be available to the primary account holder (List P, 602) and to a surrogate (list S, 604). In this example, list P 602 affords the primary account holder more discretion than list S 604 affords the surrogate. In other cases, it is possible that the surrogate might have more discretion. Thus, list P automatically approves requests for $25 or less; requests for purchases of textbooks; requests for disbursements at hospitals; requests for car repair; and requests for payments of tuition, as shown in "Approved" list 606. In list P, approval is needed for expenditures above $25 at restaurants, for entertainment, for clothing, for airplane, bus or train tickets, and for car rentals, as shown in "Approval Needed" list 608.

In some embodiments, even "always approved" categories may have maximum amounts for automatic approvals for that specific category. For example, the primary account holder may set a maximum amount of $1,000 for textbooks, $3,000 for car repairs, and $10,000 for hospital expenses—any fund transfer requests above those amounts would need to be explicitly approved by the primary account holder. Moreover, in some contexts such as when an insurance company is the primary account holder, there may be no "always approved" categories.

The "Approved" list 616 in list S 604 is, not surprisingly, identical to list 606 in list P, since those expenditures don't need approval. However, the "Approval Needed" list in list S 604 is much shorter, and several items included in list 608 are included in the "Denied" list 618 of list S 604. Specifically, car rentals, entertainment and airplane tickets are automatically denied in list 618, even though they are discretionary in list 608. However, expenditures over $25 for restaurants, clothing, bus tickets and train tickets are discretionary in "Approval Needed" list 620 in list S 604, as they are included in the "Approval Needed" list 608 in list P 602. Also, the "Denied" list 610 in list P 602 is somewhat shorter than the "Denied" list 618 in list S 604.

Figure 7:
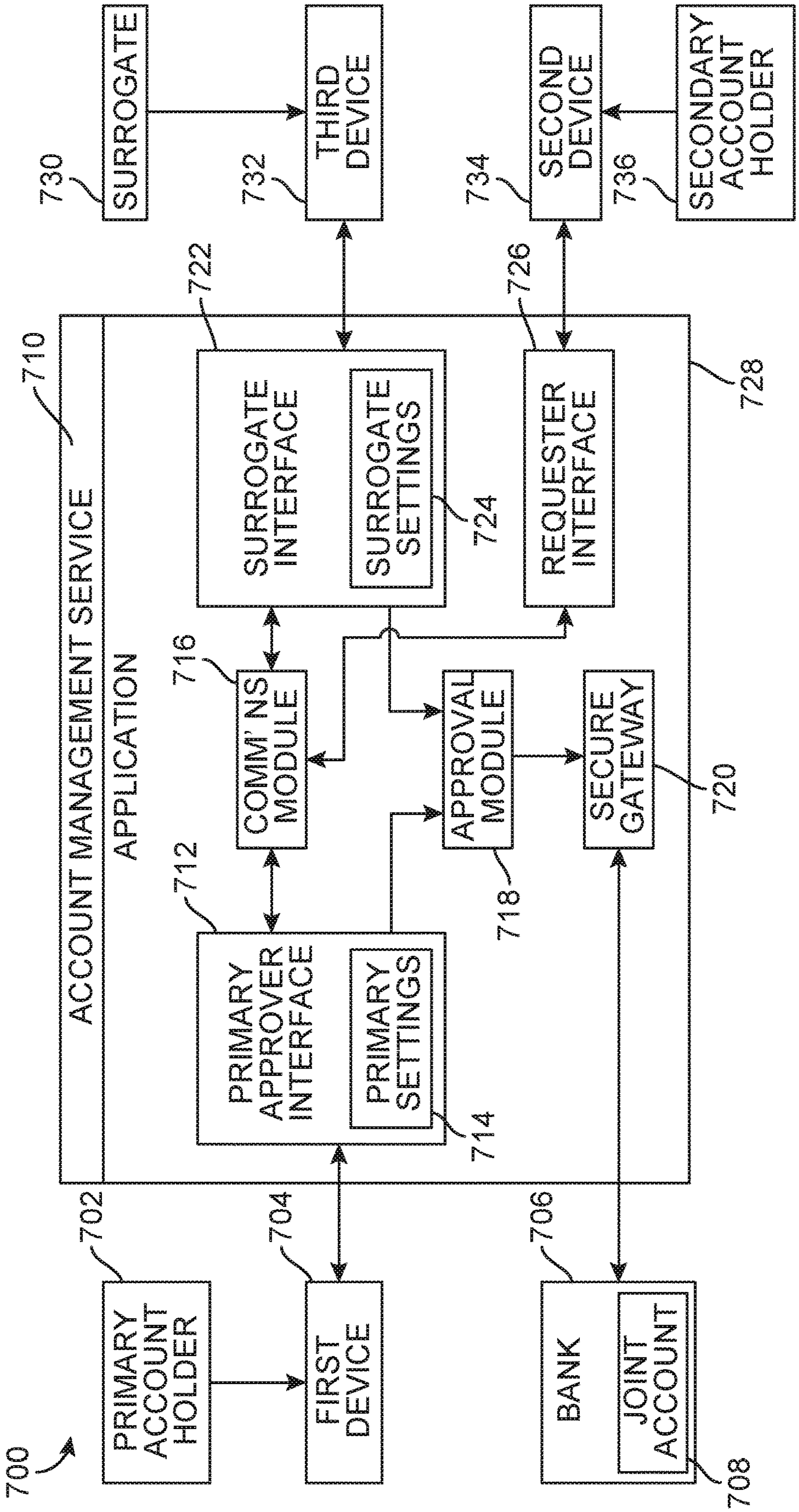
FIG. 7 is a schematic diagram of the architecture of an exemplary system for implementing a third-party approval process, in an embodiment.
Figure 8:
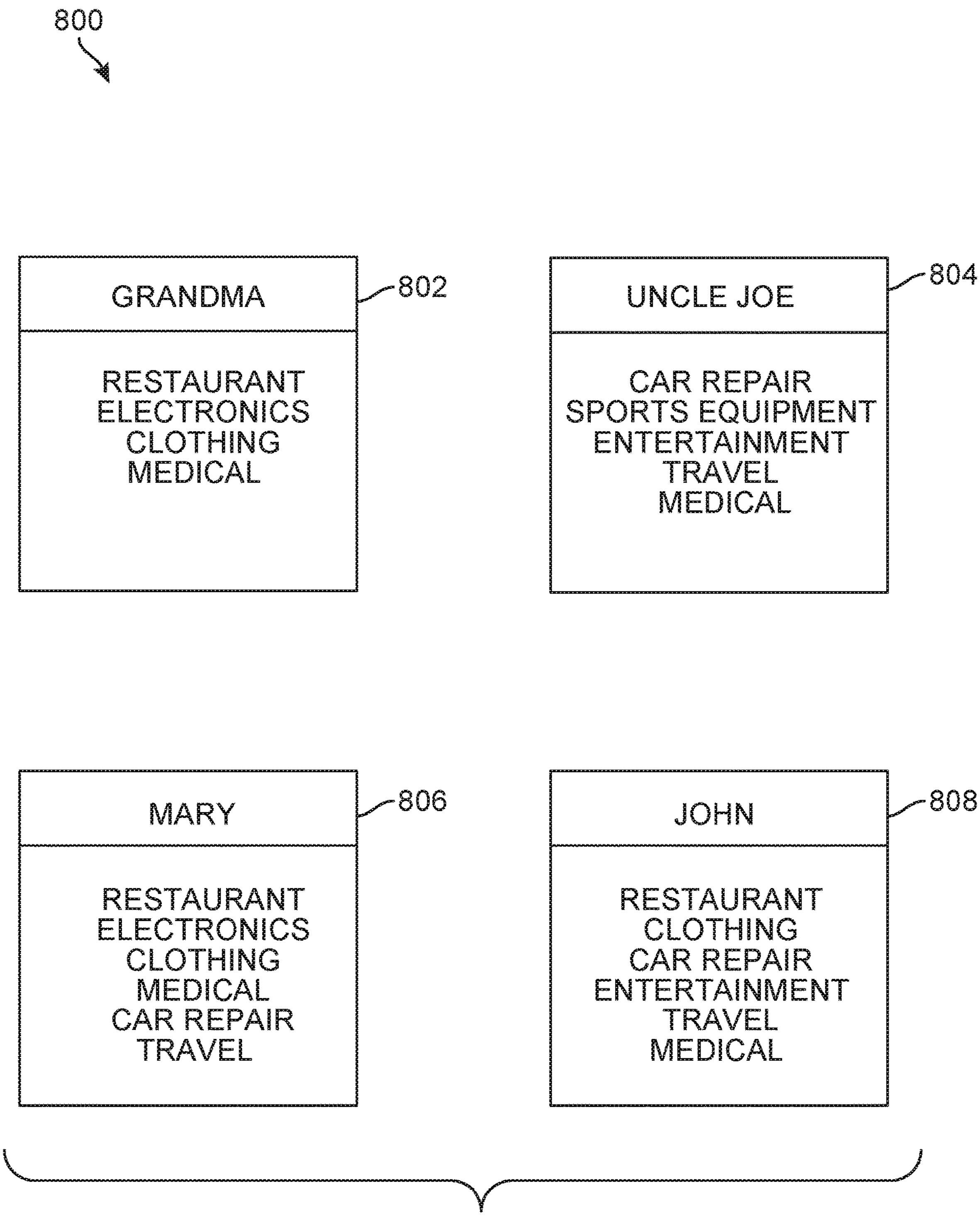
FIG. 8 is a diagram of exemplary charts listing different topics of responsibility for different surrogates, in an embodiment.

As shown in FIG. 2, an account management system (or AMS) may be used to control and direct the traffic and flow of information between the secondary account holder's smart phone, the surrogate's smart phone and the financial institution's server. FIG. 7 is a schematic diagram 700 illustrating an exemplary architecture of an app 728 for managing communications between the primary account holder, the secondary account holder, the surrogate and the financial institution. In one embodiment of an account management system 710, it typically resides in the cloud, although it may also be based in another context, such as in a bank, a credit card issuer, an insurance company, another company, a university or other institution. For example, a university may provide AMS systems to the parents of students attending the university. In this example, the primary account holder 702 may communicate with the account management service 710 using a first device 704 (which may be a smart phone, a smart tablet, a laptop computer or other device which can communicate in real time) through primary approver interface 712 (which houses primary settings 714). Secondary account holder 736 may communicate with the account management service 710 using second device 734, which may be a smart phone, a smart tablet, a laptop computer or other device that can communicate in real time. Surrogate 730 may communicate with the account management service 710 using third device 732, which may be a smart phone, a smart tablet, a laptop computer or another device which can communicate in real time. The communications are transmitted or received via communications module 716 in account management service 710. Communications module 716 provides secure communications between approval module 718, surrogate interface 722 and primary approver interface 712 on the one hand, and communications modules in banks, insurance companies, credit card issuers or other financial institutions as defined above.

When secondary account holder 736 decides to make a request for funds, he or she transmits that request via second device 734 to requester interface 726 within account management service 710. As described in flow chart 500 illustrated in FIG. 5, if primary account holder's 702 first device cannot be reached, the approval process then relies on a surrogate such as surrogate 730 and her device, third device 732.

In that case, requester interface 726 transmits the request through communications module 716 and surrogate interface 722 to third device 732 which is associated with surrogate 730. Surrogate 730 then prepares her response which is transmitted via surrogate interface app 722 and communications module 716 back through requester interface 726 to the secondary account holder's second device 734. This lets the secondary account holder know whether his or her request has been approved. Within surrogate interface 722, surrogate settings app 724 may check the surrogate's response to make sure that the response fits within the parameters specified by primary account holder 702. If the surrogate has not made a final decision, the surrogate interface 722 might transmit a demand for additional information, in which case the secondary account holder must submit an explanation for his request. If the request has been approved, surrogate interface 722 transmits the approval via approval module 718 and secure gateway 720 to authorize a transfer of funds from joint account 708 in bank 706.

Note that because primary account holder's device, first device 704, is not communicating, primary approver interface 712 and primary settings 714 are not involved in this process, which relies on the surrogate to approve or deny the request.

In many cases, a primary account holder may prefer to rely on more than one surrogate. For example, one surrogate may be more knowledgeable with respect to certain issues, whereas other surrogates may have their own distinct areas of experience or expertise. In any event, the use of more than one surrogate ensures that the system is more robust since there will likely be at least one available surrogate. This is illustrated in the set of charts 800 shown in FIG. 8, where different issues are assigned to different persons. For example, in the illustrative examples shown in FIG. 8, according to chart 802, Grandma may be asked to assume responsibility for transactions involving restaurants, electronics, clothing and medical issues, whereas Uncle Joe may be asked to assume responsibility for issues relating to car repair, sports equipment, entertainment, travel and medical issues as shown in chart 804. In addition to Grandma and Uncle Joe, the primary account holder may ask her friends John and Mary to assume responsibility as well, as shown in chart 806 for Mary and chart 808 for John. It should be noted that the categories in the charts are not exclusive. For example, because medical issues may be the most important, they may be addressed by any of the potential surrogates. Restaurant and clothing issues may be addressed by all the surrogates except for Uncle Joe; car repair issues and travel issues may be addressed by all except for Grandma; and entertainment may be addressed by either Uncle Joe and John. In other words, the categories in the list are typically redundant in that more than one surrogate may exercise his or her judgment with respect to certain categories, although some categories, such as sports equipment, may be delegated only to one surrogate (Uncle Joe in the example shown in FIG. 8).

In other cases, the primary account holder may decide to appoint several surrogates, and the decision as to whether to approve payment would have to be made according to a majority vote of the several surrogates responding to the fund transfer request. The primary account holder may alternatively appoint one lead surrogate as being responsible for a given category, but may also provide the two or more other surrogates who agree with each other could override the lead surrogate.

In another example, if the primary account holder is an insurance company, different surrogates may typically be used for different topics, for example plumbers for plumbing repairs, electricians for electrical repairs, furniture experts for furniture purchases, and so on. For example, an insurance company may have a list of approved providers for each of the categories, and the insured party may be authorized to obtain service or goods from the approved providers within certain limits.

Figure 9:
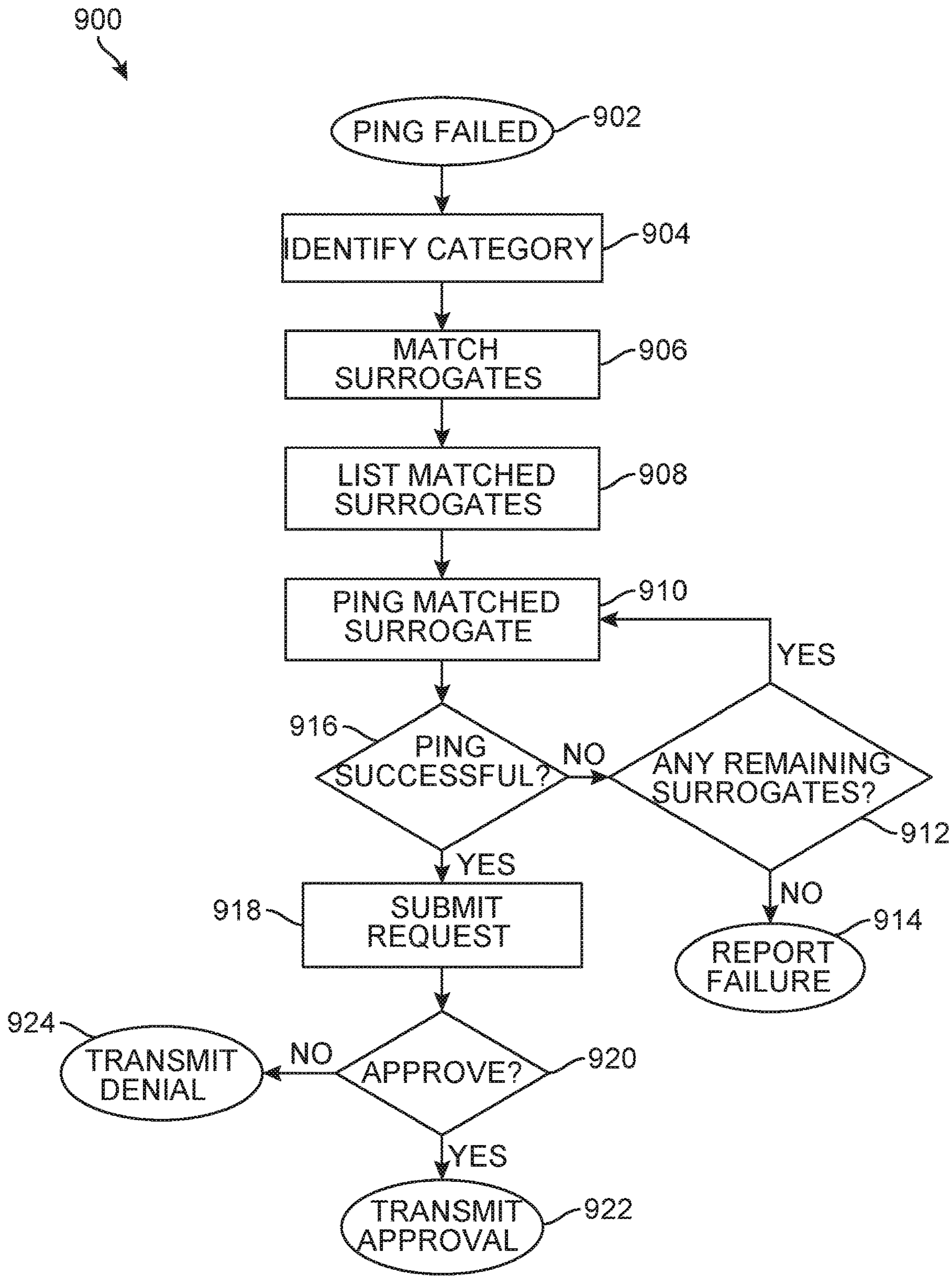
FIG. 9 is a flow chart showing steps that may be taken to implement a multiple third-party approval system, in an embodiment.

Flow chart 900 in FIG. 9 is an illustration of an exemplary process that might be used when additional surrogates as well as a first surrogate have assumed responsibility for approving or denying a second account holder's proposed transactions, in an embodiment. With the additional surrogates, the surrogate interface may need to check with the surrogates in a predetermined order. In the embodiment illustrated in flow chart 900 of FIG. 9, the various surrogates may be ranked in an order that corresponds to their knowledge and experience with respect to the category of the fund request being submitted. The process may start with step 902, when, in response to a request submitted by a secondary account holder, an AMS pings the primary account holder's device, and the ping fails and/or the primary account holder does not respond in real time to repeated attempts to elicit a response. The AMS then identifies the category of the request in step 904, and identifies surrogates that match the issue raised in the request in step 906, and generates a list of matched surrogates in step 908. The AMS then pings a matched surrogate in step 910. If the ping is found to be successful in step 916, the AMS submits the request to the surrogate's device in step 918. If the request is approved in step 920, the approval is transmitted in step 922 to the secondary account holder's device and to the bank or other institution holding the account in question. If the request is not approved, a denial is transmitted to the secondary account holder's device in step 924.

Returning to step 916, if the ping to the first matched surrogate is not successful, in step 912 the AMS checks to determine if there are any remaining surrogates who have been assigned the responsibility for responding to this particular category of requests. If there are no remaining surrogates, the failure to reach a responsible surrogate may be reported to the secondary account holder, in step 914 possibly so that he or she can try again at a later time. Thus the process illustrated in flow chart 900 may be used to reach one of several surrogates when the primary account holder's device is not responding in real time to pings sent by the AMS.

Figure 10:
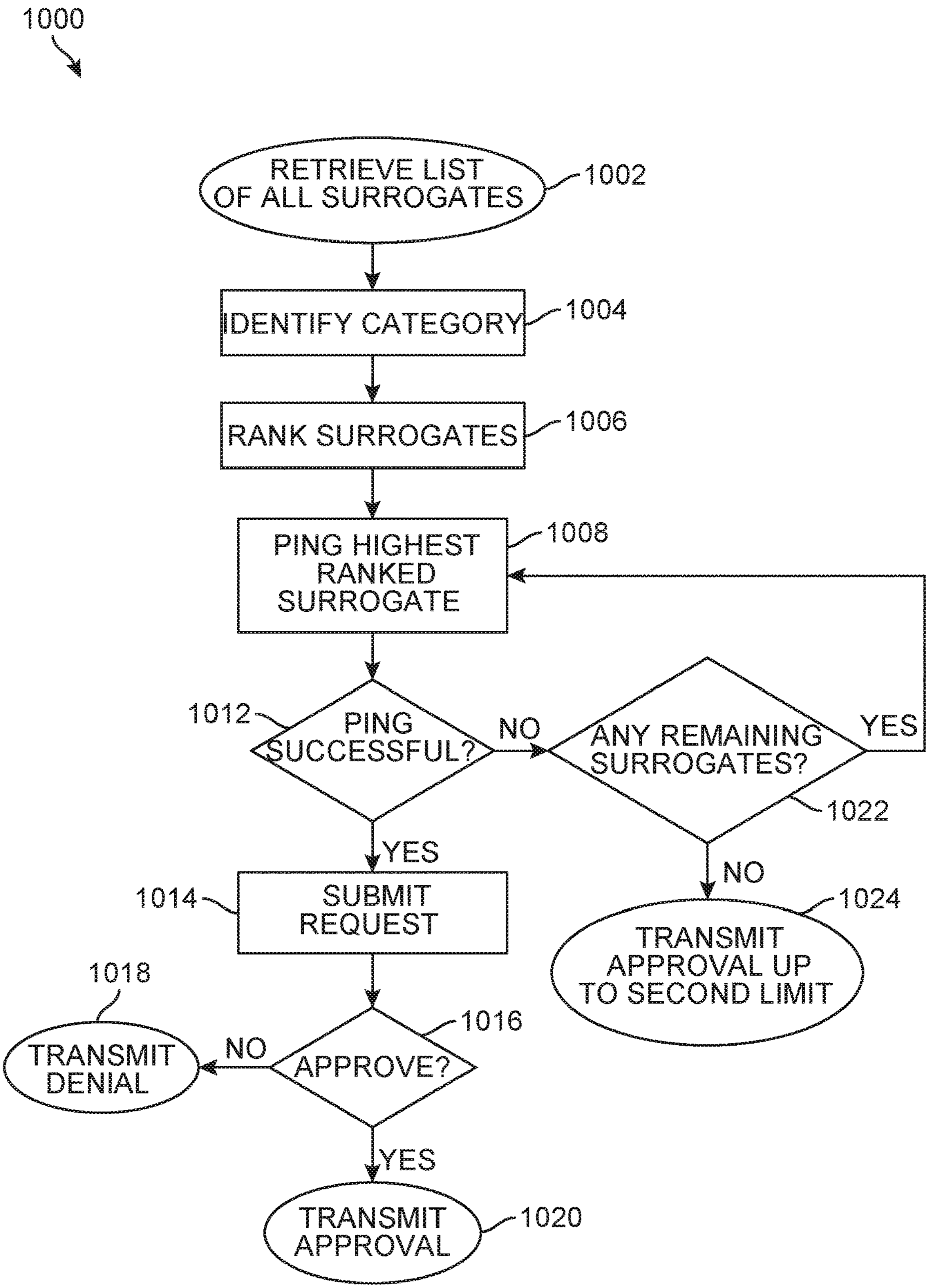
FIG. 10 is flow chart showing steps that may be taken to implement a multiple third-party approval system, in another embodiment.

Another embodiment of a process for managing the possible disbursement of funds from a joint account is illustrated in flow chart 1000 shown in FIG. 10. This process differs from the process illustrated in the flow chart of FIG. 9, because in this embodiment the AMS attempts to reach each of the surrogates, who have been ranked according to their knowledge and experience in each category. After the AMS determines that the primary account holder's device is not responding or if the primary account holder does not respond to repeated attempts to elicit a response, the process starts with step 1002, when the AMS retrieves a list of all the surrogates. The AMS then identifies the category of the request in step 1004, and ranks the surrogates in step 1006, based upon their relative expertise with that particular category, based upon information provided by the primary account holder. The AMS then pings the highest ranked surrogate in step 1008. If the ping is found to be successful in step 1012, the AMS submits the secondary account holder's request in step 1014. If the request is approved in step 1016, the approval is transmitted to the secondary account holder and to the bank holding the account in step 1020. If the request is denied, the denial is transmitted to the secondary account holder in step 1018.

If the ping is not successful in in step 1012, the AMS checks to determine if there are any remaining surrogates in step 1022. If there are remaining surrogates that have not yet been pinged, the process returns to step 1008 to try again with the next highest-ranked surrogate.

In the embodiment of FIG. 9, if none of the surrogates can be reached, the AMS reports the failure to reach any surrogate in step 914 of flow chart 900. In the embodiment of FIG. 10, the primary account holder may have decided that if none of the surrogates can be reached, the secondary account holder should be allowed to withdraw funds up to a higher second limit. For example, if the default limit for which no approvals would be required were normally $25 for example, the higher second limit could be $100, for example. In that case, if the AMS determines that there are no remaining surrogates in step 1022, it may then transmit approval up to a second maximum limit (e.g., $100) in step 1024. On the other hand, if the primary account holder had not determined that a second higher limit should be available in the event that no surrogates respond to the request, then step 1024 would simply be a notice to the secondary account holder that no surrogates responded to the request as in step 914 of flow chart 900.

In different embodiments, the various devices, entities, and modules are configured to communicate with one another, for example via a Wi-Fi, cellular, Internet or other network connection and make use of and receive and share data In some examples, devices can each include various forms of communication devices including, but not limited to, a public switched telephone network (PSTN) telephone, a voice over IP (VoIP) telephone, a video phone, a handheld computer, a cellular telephone, a smart phone, an enhanced general packet radio service (EGPRS) mobile phone, or other appropriate communication devices. The network can include a large network or combination of networks, such as a PSTN, a local area network (LAN), wide area network (WAN), the Internet, a cellular network, a satellite network, one or more wireless access points, or a combination thereof connecting any number of mobile clients, fixed clients, and servers.

In addition, in some embodiments, the request submitted by a secondary user can be required to include a reason for the transaction or purchase, and/or a description of the item(s) being purchased. In some other embodiments, the primary account holder may identify specific categories or types of items or services for which no approval is required and funds are to be freely allocated and made available for those items or services. In one embodiment, the primary account holder may pre-approve a specific amount of funds to be spent during a period of time, similar to an allowance, and amounts above that must be approved. In addition, in some embodiments, the primary account holder may pre-approve all expenses occurring at a specific retail location or merchant, such as at a bookstore or at a grocery store, regardless of the frequency or expense incurred. In another example, some transactions above a certain amount or of a certain category may be configured to require only the primary account holder's approval, i.e., they may not be delegated to any surrogate. For example, if a secondary user is intending to purchase a vehicle, only the mother may approve this purchase before the funds can be released.

The processes and methods of the embodiments described in this detailed description and shown in the figures can be implemented using any kind of computing system having one or more central processing units (CPUs), graphical user interfaces (GUIs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, for example a RAM, a ROM, a flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. The term "non-transitory computer readable medium," as used herein, should not be construed as applying to transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. Collectively, the flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing devices and systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method for providing responses in real time to fund transfer requests submitted by a secondary account holder of a joint account at a financial institution, wherein the joint account is controlled by a primary account holder, comprising:

delegating responsibilities for responding to fund transfer requests to a plurality of surrogates when the primary account holder is unavailable;

determining that the primary account holder is unavailable by transmitting a ping to a first mobile computing device associated with the primary account holder and either having the ping interrupted or receiving no response in real time from the first mobile computing device in response to the ping;

transmitting fund transfer requests from a second mobile computing device associated with the secondary account holder to a plurality of third mobile computing devices each associated with one of the plurality of surrogates upon determining that the primary account holder is unavailable;

assigning the responsibilities for responding to the fund transfer requests to each of the plurality of surrogates commensurate with at least one of each of their experience and expertise with respect to various different categories of transaction of each of the fund transfer requests, by ranking the plurality of surrogates according to a match between the category of transaction of the fund transfer request and their experience and expertise;

displaying each fund transfer request on one or more of the third mobile computing devices;

providing an approve box and a deny box on a display of the third mobile computing device so that the surrogate can respond to each fund transfer request;

the surrogate responding to each fund transfer request by pressing one of the approve box and the deny box on the display of the third mobile computing device;

the third mobile computing device transmitting the surrogate's response to each fund transfer request to the second mobile computing device;

the secondary account holder using a chip card associated with the financial institution to transfer funds requested by the fund transfer request; and the third mobile computing device transmitting instructions to the financial institution to disburse funds from the joint account whenever the surrogate activates the approve box for each fund transfer request.

2. The method of claim 1, wherein the surrogate's response is transmitted to the second mobile computing device through an account management service.

3. The method of claim 2, wherein the account management service comprises a secure gateway configured to transmit the surrogate's response to the financial institution.

4. The method of claim 1, further comprising providing a third box on the display of the third mobile computing device configured to activate transmittance of a request by the surrogate for a rationale for each of the fund transfer requests.

5. The method of claim 1, wherein the step of delegating responsibilities for responding to the fund transfer requests to a surrogate includes the primary account holder designating a plurality of ranked surrogates; and the method further comprises determining that one of the plurality of ranked surrogates is available by transmitting pings to the third mobile computing device associated with the surrogate, the determination occurring in order of the ranking of the surrogates and ending when a surrogate with a highest rank is found to be available.

6. The method of claim 1, wherein the funds transfer request is withdrawing cash from an automated teller machine, and the method includes initiating the funds transfer by inserting the chip card into the automated teller machine.

7. The method of claim 1, wherein assigning the responsibilities for responding to the fund transfer requests to each of the plurality of surrogates is redundant across the various different categories of transaction such that more than one of the plurality of surrogates is assigned to each of the various different categories of transaction.

8. The method of claim 1, wherein the primary account holder is an insurance company.

9. The method of claim 1, wherein the primary account holder is an insurance company, and the funds transfer request includes making a purchase and charging the purchase to the insurance company.

10. The method of claim 1, wherein the primary account holder has set a first expense limit and a second expense limit on the fund transfer requests, and any of the fund transfer requests for funds below the first expense limit is automatically approved, and any of the fund transfer requests between the first and second expense limits is only automatically approved if no surrogate responds in real time to the fund transfer requests.

11. The method of claim 1, wherein the fund transfer requests for certain categories are automatically approved as long as they fall below certain expense limits for the category corresponding to each of the fund transfer requests.

* * * * *